(12) United States Patent
Bischof et al.

(10) Patent No.: US 11,311,008 B2
(45) Date of Patent: Apr. 26, 2022

(54) CRYOPRESERVATION COMPOSITIONS AND METHODS INVOLVING NANOWARMING

(71) Applicants: REGENTS OF THE UNIVERSITY OF MINNESOTA, Minneapolis, MN (US); SMITHSONIAN INSTITUTION, Washington, DC (US)

(72) Inventors: John Bischof, St. Paul, MN (US); Kanav Khosla, New Delhi (IN); Zhenpeng Qin, Allen, TX (US); Mary Margaret Hagedorn, Kaneohe, HI (US); Cari Suzanne Dutcher, North Oaks, MN (US)

(73) Assignees: REGENTS OF THE UNIVERSITY OF MINNESOTA., Minneapolis, MN (US); SMITHSONIAN INSTITUTION, Washington, DC (US)

( * ) Notice: Subject to any disclaimer, the term of this patent is extended or adjusted under 35 U.S.C. 154(b) by 694 days.

(21) Appl. No.: 16/094,316

(22) PCT Filed: Apr. 19, 2017

(86) PCT No.: PCT/US2017/028351
§ 371 (c)(1),
(2) Date: Oct. 17, 2018

(87) PCT Pub. No.: WO2017/184721
PCT Pub. Date: Oct. 26, 2017

(65) Prior Publication Data
US 2019/0116783 A1     Apr. 25, 2019

Related U.S. Application Data

(60) Provisional application No. 62/324,624, filed on Apr. 19, 2016.

(51) Int. Cl.
*A01N 1/02*     (2006.01)

(52) U.S. Cl.
CPC ......... *A01N 1/0221* (2013.01); *A01N 1/0231* (2013.01); *A01N 1/0294* (2013.01)

(58) Field of Classification Search
CPC .................................................. A01N 1/0221
See application file for complete search history.

(56) References Cited

U.S. PATENT DOCUMENTS

| | | |
|---|---|---|
| 5,328,821 A | 7/1994 | Fisher et al. |
| 5,660,076 A | 8/1997 | Jonkka et al. |
| 5,780,295 A | 7/1998 | Livesey et al. |
| 6,381,967 B1 | 5/2002 | Craig |
| 7,112,576 B1 | 9/2006 | Hubel |
| 8,790,923 B2 | 9/2014 | Ennis et al. |
| 2005/0016198 A1 | 1/2005 | Wowk et al. |
| 2009/0133410 A1 | 5/2009 | Thorne et al. |
| 2010/0003197 A1 | 1/2010 | Bikram |
| 2010/0317108 A1 | 12/2010 | Stojanov |
| 2011/0207112 A1 | 8/2011 | Burbank et al. |
| 2012/0087868 A1 | 4/2012 | Todd et al. |
| 2012/0251999 A1 | 10/2012 | Demirci et al. |
| 2012/0276334 A1 | 11/2012 | Fedynshyn et al. |
| 2015/0351381 A1 | 12/2015 | Vom et al. |
| 2016/0015025 A1 | 1/2016 | Bischof et al. |
| 2016/0021874 A1 | 1/2016 | Mazur |
| 2017/0306288 A1 | 10/2017 | Gale et al. |
| 2017/0350798 A1 | 12/2017 | Carragher et al. |
| 2018/0192639 A1 | 7/2018 | Brockbank et al. |

FOREIGN PATENT DOCUMENTS

| | | |
|---|---|---|
| CN | 101744766 A | 6/2010 |
| CN | 102835389 A | 12/2012 |
| CN | 104782616 A | 7/2015 |
| CN | 104012521 B | 8/2015 |
| CN | 205624138 U | 10/2016 |
| CN | 107189940 A | 9/2017 |
| EP | 2381236 A1 | 10/2011 |
| JP | 2011 231021 A | 11/2011 |
| WO | 2007/077560 A2 | 7/2007 |
| WO | 2014/085801 A1 | 6/2014 |
| WO | 2014/143961 A1 | 9/2014 |
| WO | WO 2017/184721 | 10/2017 |
| WO | 2018/073242 A1 | 4/2018 |

OTHER PUBLICATIONS

International Patent Application No. PCT/US17/28351 filed Apr. 19, 2017; International Search Report / Written Opinion dated Jul. 7, 2017; 14 pages.
International Patent Application No. PCT/US17/28351 filed Apr. 19, 2017; International Preliminary Report on Patentability dated Oct. 23, 2018; 7 pages.
Albert, "The effect of temperature and freeze-thaw processes on gold nanorods" Dec. 2009 *Nanotechnology* 20(50):505502. 6pgs.
Choi, "Review of biomaterial thermal property measurements in the cryogenic regime and their use for prediction of equilibrium and non-equilibrium freezing applications in cryobiology" 2010 *Cryobiology*, 60(1):52-70.
Etheridge, "RF heating of magnetic nanoparticles improves the thawing of cryopreserved biomaterials" Oct. 2014 *Technology*, 2(03):229-242.
Fahy, "Improved vitrification solutions based on the predictability of vitrification solution toxicity" 2004 *Cryobiology* 48(1):22-35.
Frazier, "Effects of Heating Temperature and Duration by Gold Nanorod Mediated Plasmonic Photothermal Therapy on Copolymer Accumulation in Tumor Tissue" 2015 *Mol. Pharmaceut.*, 12:1605-1614.

(Continued)

*Primary Examiner* — Bin Shen
(74) *Attorney, Agent, or Firm* — Westman, Champlin & Koehler, P.A.; Visala C. Goswitz

(57) ABSTRACT

A cryopreservation composition generally includes a cryoprotective agent and a laser absorber that includes a metal. Rewarming a cryopreserved specimen that includes the cryopreservation composition includes subjecting the cryopreserved specimen to a laser pulse effective to heat the laser absorber sufficiently to thaw the cryopreserved biospecimen.

7 Claims, 7 Drawing Sheets

(56) References Cited

OTHER PUBLICATIONS

Hagedorn, "Characterization of a Major Permeability Barrier in the Zebrafish Embryo" 1998 *Biology of reproduction*, 59(5):1240-1250.

Hagedorn, "Magnetic resonance microscopy and spectroscopy reveal kinetics of cryoprotectant permeation in a multicompartmental biological system" 1996 *Proceedings of the National Academy of Sciences*, 93(15):7454-7459.

Hagedorn, "Water distribution and permeability of zebrafish embryos, Brachydanio rerio" 1997 *Journal of Experimental Zoology*, 278(6):356-371.

Hagedorn, "Zebrafish reproduction: revisiting in vitro fertilization to increase sperm cryopreservation success" 2011 *PloS one*, 6(6):e21059.

Hagedorn, "High ice nucleation temperature of zebrafish embryos: slow-freezing is not an option" 2004 *Cryobiology*, 49(2):181-189.

Janik, "Microinjection of cryoprotectants into the yolk of zebrafish embryos (Brachydanio rerio)" 2000 *Biol Reprod*, 62:146.

Jin, "High survival of mouse oocytes/embryos after vitrification without permeating cryoprotectants followed by ultra-rapid warming with an IR laser pulse" Mar. 2015 *Sci Reports*, 5(9271):6 pgs.

Jin, "Survivals of mouse oocytes approach 100% after vitrification in 3-fold diluted media and ultra-rapid warming by an IR laser pulse" 2014 *Cryobiology*, 68(1):419-430.

Khosla, "Cryopreservation of Zebrafish Embryos: New Approach" IEM poster, Sep. 21, 2015. 1 pg.

Khosla, "Modeling Laser Heating of Zebrafish Embryos Containing Gold Nanoparticles (GNP)" NEMB poster, Apr. 17, 2015. 1 pg.

Kleinhans, "Physical Parameters, Modeling, and Methodological Details in Using IR Laser Pulses to Warm Frozen or Vitrified Cells Ultra-Rapidly" 2015 *Cryobiology*, 70(2):195-203.

Kleinhans, "Simple. inexpensive attainment and measurement of very high cooling and warming rates" 2010 *Cryobiology*, 61(2):231-233.

Mazur, "Survival of mouse oocytes after being cooled in a vitrification solution to—196° C. at 95° to 70,000° C./min and warmed at 610° to 118,000° C./min: A new paradigm for cryopreservation by vitrification" Feb. 2011 *Cryobiology*, 62(1):1-7.

Manuchehrabadi, "Improved tissue cryopreservation using inductive heating of magnetic nanoparticles" *Sci Trasnl Med.*, 9:eaah4586.

Qin, "Thermophysical and biological responses of gold nanoparticle laser heating" 2012 *Chemical Society Reviews*, 41(3):1191-1217.

Rios, "Thermal Expansion of blood vessels in low cryogenic temperatures, Part II: Vitrification with VS55, DP6, and 7.05 M DMSO" 2006 *Cryobiology*, 52(2):284-294.

Vig, "Separation enhancement in pinched flow fractionation" Applied Physics Letters (2008) 93(20):203507.

Xi, "Active droplet sorting in microfluidics: a review." Lab on a Chip (2017) 17, 751-771.

Yamada, "Pinched flow fractionation: continuous size separation of particles utilizing a laminar flow profile in a pinched microchannel" Analytical Chemistry (2004) 76(18):5465-5471.

Zhao, "Microfluidics for cryopreservation" Biotechnology Advances (2017) 35(2):323-336.

Zhou, "Investigation on the thermal performance of a novel microchannel-aided device for vitrification of cells/tissues" Applied Thermal Engineering (2017) vol. 119, pp. 189-196.

Warnock, "Long-term follow-up after transplantation of insulin-producing pancreatic islets into patients with type 1 (insulin-dependent) diabetes mellitus" Diabetologia (1992) 35(1):89-95.

International Patent Application No. PCT/US17/17331, filed Feb. 17, 2017; International Search Report / Written Opinion dated May 8, 2017; 9 pages.

International Patent Application No. PCT/US17/17331, filed Feb. 17, 2017; International Preliminary Report on Patentability dated Aug. 30, 2018; 7 pages.

Patent Application No. PCT/US2014/028166, filed Mar. 14, 2014; International Preliminary Report on Patentability, dated Sep. 24, 2015; 9 pages.

Patent Application No. PCT/US2014/028166, filed Mar. 14, 2014; International Search Report and Written Opinion, dated Aug. 6, 2014; 14 pages.

Bearer, "A Simple Method for Quick-Freezing" 1986 J Electron Microsc Tech 3(2): 233-241.

Belete, "Novel aqueous nano-scaled formulations of oleic acid stabilized hydrophobic superparamagnetic iron oxide nanocrystals" Feb. 2013 Drug Development And Industrial Pharmacy, 39(2): 186-196.

De Graaf, "Cryopreservation of rat precision-cut liver and kidney slices by rapid freezing and vitrification." Cryobiology, 2007. 54(1): p. 1-12.

Deng, "Rapid electromagnetic rewarming of cryopreserved tissues using nano-magnetoparticlesfeasibility study" 2008 Proceedings of the 2nd International Conference on Integration and Commercialization of Micro and Nanosystems, 427-428.

Etheridge, "Radiofrequency heating of magnetic nanoparticle cryoprotectant solutions for improved cryopreservation protocols" 2013 Cryobiology, 67:398-399.

Goiti, "Effect of magnetic nanoparticles on the thermal properties of some hydrogels" 2007 Polymer Degradation And Stability, 92:2198-2205.

Halmagyi, "Cryopreservation of Chrysanthemum morifolium (Dendranthema grandiflora Ramat.) using different approaches", Plant Cell Reports, vol. 22, No. 6, (Jan. 1, 2004), pp. 371-375, XP55737332, DOI: 10.1007/ S00299-003-0703-9.

Hou, "Magnetic nanohydroxyapatite/PVA composite hydrogels for promoted osteoblast adhesion and prolyferation" Mar. 2013 Colloids And Surfaces B: Biointerfaces, 103(1):318-325.

Manuchehrabadi, "Nanowarming of Tissues", Cryobiology, (Dec. 1, 2016), but presented earlier on Jul. 26, 2016 during meeting CRYO2016), pp. 399-443, XP055386203, DOI: 10.1016/j.cryobiol. 2016.09.091.

Moscoso-Londono, "Structural and magnetic behaviour of ferrogels obtained by freezing thawing of polyvinyl alcohoVpoly(acrylic acid)(PAA)-coated iron oxide nanoparticles" Feb. 2, 2013 European Polymer Journal, 49(2); 279-289.

Polyak, "High field gradient targeting of magnetic nanoparticle-loaded endothelial cells to the surfaces of steel stents" 2008 PNAS, I 05(2), 698-703.

Prow, "Ocular nanoparticle toxicity and transfection of the retina and retinal pigment epithelium" 2008 Nanomedicine: Nanotechnology, Biology And Medicine, 4:340-349.

Rypka, "A novel simplified ultra-rapid freezing technique for cryopreservation of tissue slices", Cryobiology, vol. 52, No. 2 (Apr. 1, 2006), pp. 193-199, XP024943396, DOI: 10.1016/j.cryobiol. 2005.10.012.

Said et al. Utility of Magnetic Cell Separation as a Molecular Sperm Preparation Technique, Journal of Andrology, vol. 29, No. 2, Mar./Apr. 2018.

Wang, "Numerical simulation of the effect of superparamagnetic nanoparticles on microwave rewarming of cryopreserved tissues" Feb. 13, 2014 Cryobiology, 68:234-243.

Yong,. "Green, biodegradable, underwater superoleophobic wood sheet for efficient oil/water separation." ACS omega 3.2 (Feb. 1, 2018): 1395-1402.

International Patent Application No. PCT/US20/13956, filed Jan. 16, 2020; International Search Report / Written Opinion dated Jun. 2, 2020.

Examination Report issued for related EP patent application serial No. 17753905.3, dated Oct. 12, 2020.

International Search Report issued for PCT/US2019/041366, dated Nov. 14, 2019.

Written Opinion of the International Searching Authority issued for PCT/US2019/041366, dated Nov. 14, 2019.

International Search Report and Written Opinion issued for PCT/US2020/019692, dated May 22, 2020.

Cao, Z. et al. "Droplet sorting based on the number of encapsulated particles using a solenoid valve" Lab on a Chip (2013) 13, pp. 171-178.

Choi, "Improved low-CPA vitrification of mouse oocytes using quartz microcapillary." Cryobiology 70.3 (2015): 269-272.

(56) References Cited

OTHER PUBLICATIONS

Clark, "oocyte cryopreservation: searching for novel improvement strategies" J Assist Peprod Genet (2013) 30:865-875.
Daly, "Successful cryopreservation of coral larvae using vitrification and laser warming", Scientific Reports, 2018, 8(1): 15714. Published online Oct. 24, 2018.
Demirci, U. and G. Montesano "Cell encapsulating droplet vitrification." Lab on a Chip, 2007. 7: p. 1428-1433.
Glavan, "Electroanalytical devices with pins and threads" Lab on a Chip (2016) 16, 112-119.
Graf, "Image-Based Fluidic Sorting System for Automated Zebrafish Egg Sorting into Multiwell Plates" JALA (2011) 16, pp. 105-111.
Hashemi, "Microflow cytometer for optical analysis of phytoplankton." Biosensors Bioelectronics, 26 (2011), pp. 4263-4269.
He, "Vitrification by ultra-fast cooling at a low concentration of cryoprotectants in a quartz micro-capillary: a study using murine embryonic stem cells." Cryobiology 56.3 (2008): 223-232.
Howe, The zebrafish reference genome sequence and its relationship to the human genome. Nature (2013) 496:498-503.
Huh, "Microfluidics for flow cytometric analysis of cells and particles." Physiol Measur, 26 (2005), pp. R73-R98.
Imaging Flow Cytometry. https://www.luminexcorp.com/imaging-flow-cytometry/, accessed Jun. 2019.
Khosla, K. et al. "Gold Nanorod Induced Warming of Embryos from the Cryogenic State Enhances Viability." ACS nano, 2017. 11(8): p. 7869-7878.
Koo, "A Cryo-Cooling Microfluidic Channel Device for a Magnetic Resonance (MR) Microscopy System." (2010) 14th International Conference on Miniaturized Systems for Chemistry and Life Sciences, Oct. 3-7, 2010, Groningen, The Netherlands.
Lai, "Microfluidics for Assisted Reproductive Technologies" Chap. 7 of Microfluidics for Medical Applications (2015).
Lai, "Recent microfluidic devices for studying gamete and embryo biomechanics" Journal of Biomechanics (2015) 48, 1671-1678.
Lai, "Slow and steady cell shrinkage reduces osmotic stress in bovine and murine oocyte and zygote vitrification" Human Reproduction (2015) vol. 30, No. 1, pp. 37-45.
Lee, "Microtechnology for Cell Manipulation and Sorting" Microsystems and Nanosystems (2017) Springer International Publishing.
Li, "On-Chip Cryopreservation of Living Cells" JALA: Journal of the Association for Laboratory Automation (2010) 15 (2):99-106.
Mazur, "Cryopreservation of the germplasm of animals used in biological and medical research: importance, impact, status, and future directions." Biology of reproduction, 2008. 78(1): p. 2-12.
Metcalf, "Interfacial Tensions of Aged Organic Aerosol Particle Mimics Using a Biphasic Microfluidic Platform" Environmental Science and Technology (2016) 50, 1251-1259.
Moldovan, "Principals of Kenzan Method for Robotic Cell Spheroid-Based Three-Dimensional Bioprinting" (2017) Tissue Engineering: Part B, vol. 23, No. 3, 237-244.
Risco, "Thermal performance of quartz capillaries for vitrification." Cryobiology (2007) 55:222-229.
Schier, "Genomics: Zebrafish earns its stripes" Nature (2013) 496(7446):443-444.
Shi, "High-Throughput Non-Contact Vitrification of Cell-Laden Droplets Based on Cell Printing" Scientific Reports (2015) 5:17928.
Song, "Modelling and optimization of micro optofluidic lenses" Lab on a Chip (2009) 9, 1178-1184.
Spencer, "A sheath-less combined optical and impedance microcytometer" Lab on a Chip (2014) 14, pp. 3064-3073.
Stan, "A microfluidic apparatus for the study of ice nucleation in supercooled water drops" Lab on a Chip (2009) 16, pp. 2253-2408.
Stavrakis, "High-throughput microfluidic imaging flow cytometry" Current Opinion in Biotechnology (2019) 55, pp. 36-43.
Daly et al., "Successful cryopreservation of coral larvae using vitrification and laser warming," *Scientific Reports*, 2018, 8(1):15714. Published online Oct. 24, 2018.
Janik et al, "Overcoming a permeability barrier by microinjecting cryoprotectants into zebrafish embryos (*Brachydanio rerio*)," *Cryobiology*, 2000, 41(1):25-34.
Khosla et al., "Characterization of Laser Gold Nanowarming: A Platform for Millimeter-Scale Cryopreservation," *Langmuir*, 2019, 35(23):7364-7375. Published online Oct. 25, 2018.
Bordelon, D.E. "Magnetic nanoparticle heating efficiency reveals magneto-structural differences when characterized with wide ranging and high amplitude alternating magnetic fields" (2011) J. Appl. Phys. 109, 124904.
Khosla, "Modeling Laser Heating of Zebrafish Embryos Containing Gold Nanoparticles (GNP)" NEMB poster, Apr. 19, 2015. 1 pg.

(A)

(B)

CRYOPRESERVATION COMPOSITIONS AND METHODS INVOLVING NANOWARMING

CROSS-REFERENCE TO RELATED APPLICATION

This application is the § 371 U.S. National Stage of International Application No. PCT/US2017/028351, filed Apr. 19, 2017, which claims the benefit of U.S. Provisional Application No. 62/324,624, filed Apr. 19, 2016, disclosures of which are incorporated by reference herein in their entireties.

SUMMARY

This disclosure describes cryopreservation compositions and methods. In one aspect, this disclosure describes a cryoprotective composition that generally includes a cryoprotective agent and a laser absorber comprising a plasmonic material.

In some embodiments, the laser absorber comprises a gold nanorod.

In another aspect, this disclosure describes a cell that includes any embodiment of the cryopreservative composition summarized immediately above.

In some embodiments, the laser absorber is distributed in all compartments of the cell.

In another aspect, this disclosure describes a method of rewarming a cryopreserved biospecimen. Generally, the method includes obtaining a cryopreserved specimen that includes any embodiment of the cryoprotective composition summarized above and subjecting the cryopreserved specimen to a laser pulse effective to heat the laser absorber sufficiently to thaw the cryopreserved biospecimen.

In some embodiments, the laser pulse produces a warming rate of at least 500,000° C./min.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
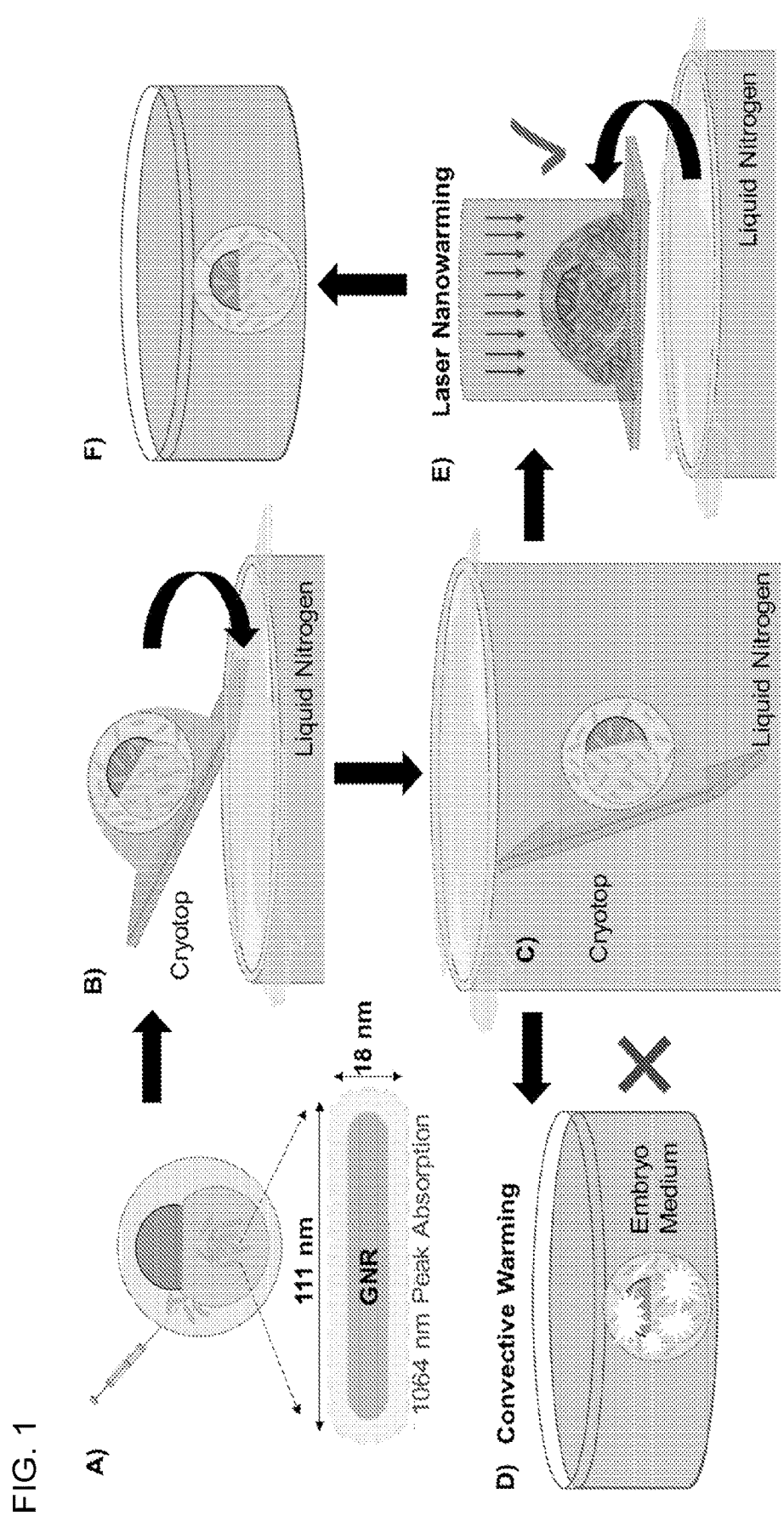
FIG. 1. Overview of zebrafish embryo cryopreservation and laser rewarming. The process includes: (A) microinjection of a laser absorber (e.g., 1064 nm resonant gold nanorods (GNR)) and cryopreservation agent (e.g., polyethylene glycol (PG)) into the yolk and chorionic space of the embryo, followed by (B) rapid cooling with the liquid nitrogen to prevent ice formation, and followed by storage in (C). From here, one can choose (D) convective warming in embryo medium at 28° C. which uniformly yields intra embryonic ice crystallization and death, or one can choose (E) laser GNR warming which yields rapid and uniform warming inside the embryo to outrun any ice formation.

This disclosure describes compositions and methods that may be used to warm cryopreserved biological specimens. The methods and compositions described herein are useful for, for example, warming millimeter-sized cryopreserved biological specimens such as, for example, zebrafish embryos, germplasm, and/or other 100 micrometer to millimeter-sized model systems such as, for example, pancreatic islet cells, stem cells, biopsies of tissues, etc.

Cryopreservation allows viable cells and tissues to be preserved over time in the hypothermic, frozen, or vitrified (glassy) state. The typical approach for vitrification of bulk systems is to load them with highly concentrated (6 M to 8 M) solutions of a cryoprotectant agent (CPA), which dehydrates the cell in the bulk tissue and allows solidification into a glassy state without forming ice inside of the cells. High CPA concentrations are often needed in bulk systems since rates of cooling are diffusion-limited. However, these higher CPA concentrations can be toxic, particularly for single cell and/or primary cell systems (i.e., gametes and embryos).

Consequently, the technology described herein uses a lower, less toxic concentration of cryoprotective agent in combination with ultrafast cooling and warming techniques. High cooling rates decrease the extent to which ice can form during cooling. High warming rates (e.g., 10,000,000° C./min) can decrease the likelihood and/or extent to which a millimeter-sized cryopreserved specimen can devitrify (i.e., revert from glass to ice) during warming.

Existing methods for warming millimeter-sized biological specimens at such a rate include, for example, laser warming of a composition that includes a laser absorber such as India Ink (carbon black). Computer modeling suggests, however, that laser warming of India Ink cannot generate rapid heating rates required to rewarm millimeter-sized specimens uniformly. Moreover, India Ink can be toxic when injected inside of a specimen (e.g., a zebrafish embryo, FIG. 6A) and can therefore result in low survival rates.

In contrast, this disclosure describes laser-assisted heating of a composition that includes a metal laser absorber such as, for example, gold nanorods. Gold nanorods are 10× more efficient than India Ink for heating and generate heat uniformly across a specimen without toxicity. Thus, laser-assisted heating of a metal laser absorber can generate high heating rates uniformly inside a millimeter-sized biological specimen and can be used to rewarm any cryopreserved millimeter-sized biomaterial where the metal laser absorber can be disbursed.

This technology can be exploited to allow a biological stock center (e.g., an aquaculture center, germplasm stock center, or a tissue bank) to store and ship vitrified biological specimens. The recipient of the vitrified specimens can then rewarm the material using the technology described herein so that the material is suitable for, for example, research and/or commercial purposes.

For example, zebrafish (*Danio rerio*) are an increasingly important model for vertebrate genetics and biomedical research. The study of zebrafish as a genetic model has led to many new transgenic and mutant strains, but many of these strains are difficult or impossible to routinely maintain as colonies. Consequently, focus has turned to cryopreserving zebrafish embryos. While progress has been made in loading the embryos with cryoprotective agents and their vitrification (i.e., cooling without lethal ice formation), the rewarming of the vitrified zebrafish embryo remains a challenge to successful and widespread use of cryopreservation. Barriers to successful cryopreservation of millimeter-sized specimens such as zebrafish embryos include: 1) a small surface-to-volume ratio, which slows water movement out of the cells and slows the cooling and warming processes needed for successful preservation; 2) a multi-compartmental system (i.e., the blastoderm and yolk) having different permeabilities to cryoprotectant agents (e.g., the yolk is impermeable to most cryoprotectants, except methanol); and, 3) the extreme difficulty of rehydrating zebrafish embryonic cells once they have been dehydrated. Microinjection can be a safe and non-toxic method for introducing cryoprotectants into the yolk compartment to overcome the permeability challenge. Slow equi-osmotic steps can rehydrate embryos safely to overcome the issue of rehydration. The technology described herein can overcome the challenge of uniform rewarming that results from the large surface-to-volume ration of a zebrafish embryo.

The technology described herein involves microinjecting a laser absorber (e.g., gold nanorods) into a millimeter-sized biological specimen and then directing a laser at the specimen to heat the gold nanorods so that the specimen may be rewarmed without ice forming during the rewarming process. For example, in embodiments in which the specimen is a zebrafish embryo, the gold nanorods can be microinjected into the yolk and/or chorion of the embryo before subjecting the specimen to rewarming with a laser.

The technology described herein can allow, for example, aquaculture, germplasm stock centers, or tissue banks to vitrify specimens—e.g., genetic lines or gonadal biopsies or other small 100 micrometer to mm sized tissues—to centers for research or for veterinary or clinical use. Recipients of the specimen can use commercial laser systems to rewarm the specimens. The high warming rates achievable in the practice of the methods described herein allow much smaller concentrations of cryoprotectants to be used (e.g., 2 M vs. 8 M), thereby reducing cryoprotectant toxicity and expanding the breadth of biological specimens that may be stored using cryoprotection.

In one exemplary embodiment, one can uniformly distribute propylene glycol as a cryoprotective agent (CPA) and gold nanorods (GNRs) into a millimeter-sized biological specimen. During rewarming, the disbursed GNRs will generate uniform heat under near infrared (NIR) laser irradiation (700-1100 nm) without coupling to biological cells and tissues. This approach can provide uniform and rapid warming needed rewarm a millimeter-sized specimen.

The GNR provides greater warming efficiency with less toxicity than India ink. For example, using absorption efficiency ($Q_{abs}$) as a metric of NIR laser coupling potential, GNRs ($Q_{abs}$=11.5, aspect ratio=3.9) are more efficient absorbers than India ink ($Q_{abs}$=0.982). Moreover, intra-embryonic India ink is toxic while GNR is not, thus allowing GNR to be injected throughout the embryo and achieve uniform warming.

In one aspect, therefore, this disclosure describes a method that generally involves microinjecting a composition that includes a cryoprotective agent and gold nanorods into a biological specimen, then rapidly cooling the specimen to a temperature suitable for frozen storage. To rewarm the specimen, the specimen can be subjected to a NIR laser pulse. The complete method is summarized in FIG. 1.

While described herein in the context of an exemplary embodiment in which the biological specimen is a zebrafish embryo, the technology described herein can be applied to any millimeter-sized biomaterial. As used herein, the term "millimeter-sized" refers to a specimen having a smallest linear dimension of no more than 5 mm such as, for example, no more than 4 mm, no more than 3 mm, no more than 2 mm, no more than 1 mm, no more than 0.9 mm, no more than 0.8 mm, no more than 0.7 mm, no more than 0.6 mm, no more than 0.5 mm, no more than 0.4 mm, no more than 0.3 mm, no more than 0.2 mm, or no more than 0.1 mm.

Thus, for example, the specimen could include human cells (e.g., pancreatic islet cells, stem cells, biopsy specimens, etc), mouse oocytes, zebrafish embryos, *Xenopus laevis* oocytes, coral larvae, or *Lepidochelys olivacea* embryos. In many embodiments, the specimen can include germplasm—e.g., from a biopsy taken from a testis or an ovary from any animal or species. In other embodiments, however, any tissue sample that can be loaded with a cryoprotective agent and metal-containing laser absorber can be used in connection with the technology platform described herein. Exemplary alternative specimens include, for example, neural cells, ganglia, stem cell spheroids, any biopsy from any soft tissue within the size parameters listed in the immediately preceding paragraph. If the laser beam can be broadened, additional exemplary specimens include, for example, the cornea, skin, or other thin tissues.

Also, while described herein in the context of an exemplary embodiment in which the cryoprotective agent includes propylene glycol, the technology described herein can involve the use of any suitable cryoprotective agent. Exemplary suitable cryoprotective agents include, but are not limited to, combinations of alcohols, sugars, polymers, and ice blocking molecules that alter the phase diagram of water and allow a glass to be formed more easily (and/or at higher temperatures) while also reducing the likelihood of ice nucleation and growth during cooling or thawing. In most cases, cryopreservative agents are not used alone, but in cocktails. In the case of vitrification solutions, exemplary cryopreservative cocktails are reviewed in Fahy et al. *Cryobiology* 48(1):22-35, 2004. Additional exemplary cryopreservative solutions can include one or more of the following: dimethyl sulfoxide, glycerol, propylene glycol, ethylene glycol, sucrose, trehalose, raffinose, polyvinylpyrrolidone, and/or other polymers (e.g., ice blockers and/or anti-freeze proteins).

In some embodiments, the cryoprotective agent may be present in the composition at a molarity of no more the 6 M such as, for example, no more than 5 M, no more than 4 M, no more than 3 M, no more than 2 M, no more than 1 M, no more than 900 mM, no more than 800 mM, no more than 700 mM, no more than 600 mM, no more than 500 mM, or no more than 250 mM.

Finally, while described herein in the context of an exemplary embodiment in which the laser absorber is a gold nanorods, the technology described herein can involve the use of a laser absorber of any suitable geometry and containing any suitable laser absorbing plasmonic material. Generally, the laser absorbing plasmonic material absorbs a narrow band of laser energy in contrast to, for example, India Ink, which is a broad band absorber. Thus, in some embodiments, the laser absorber can include material effective at converting laser energy into heat such as, for example, a metal such as gold, silver, titanium, and/or copper. In other embodiments, the laser absorber can be an alternative plasmonic material such as, for example, graphene. In some embodiments, the laser absorber can include an additional material such as, for example, a silicon core. Thus, the laser absorber can include a plurality of materials generally constructed to include a core and a shell that at least partially covers the core. The particular material or combination of materials used in the laser absorber can be selected based, at least in part, on the particular wavelength of the laser being used to warm the specimen. For example, when using a diode laser with a wavelength of 800 nm, the laser absorber can include a gold nanoshell with a silicon core. Similarly, the laser absorber can have any suitable geometry including, for example, a rod shape, a sphere, a cube, a horn, a star, etc. Selection of materials and geometry of the laser absorber can allow broad band absorption of various laser wavelengths from, for example, 200 nm to 2000 nm. Thus, the laser can also be selected to excite at any wavelength suitable to match the absorption of the plasmonically active nanoparticle.

In some embodiments, the laser absorber is distributed throughout all compartments of the cell. For a germinal cell, such a distribution includes the presence of the laser absorber in the chorion and yolk. For a somatic cell, such a distribution includes the presence of the laser absorber in the cytoplasm and the nucleus.

Figure 6:
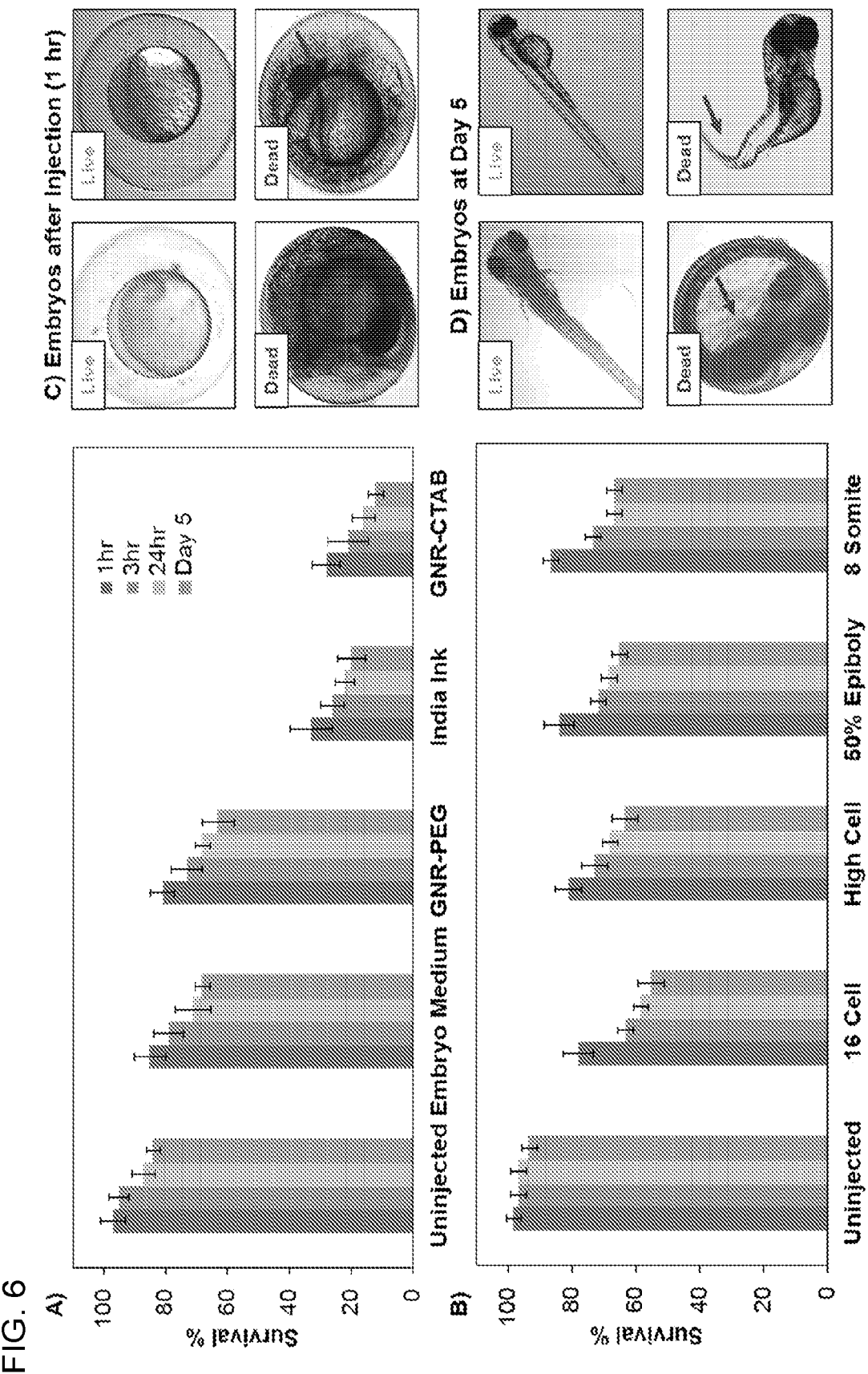
FIG. 6. Survival after microinjection of laser absorbers. (A) Three different laser absorbers (GNR-PEG, India Ink, and GNR-CTAB) were microinjected into zebrafish embryos at the High Cell stage and their survival monitored up to Day 5, with uninjected and embryo medium injected controls. GNR-PEG: GNR coated with polyethylene glycol (PEG); GNR-CTAB: GNR coated with cetyl-trimethylammonium bromide (CTAB). For all groups and controls, n=100 embryos were tested. (B) Using the same injection protocol as in (A), GNR-PEG absorber was injected into embryos at different developmental stages and compared to an uninjected control for survival out to Day 5. (C) Examples of live and dead zebrafish embryos one hour after injection of GNR-PEG and PG. (D) Examples of live and dead zebrafish embryos at Day 5 after injection.

In an exemplary embodiment in which the specimen includes zebrafish embryos, the yolk and chorion can be injected with the cryoprotective agent/gold nanorod composition at the high cell stage (t=3.3 hours) in order to maximize the uniformity of distribution throughout the embryo as it grows. Gold nanorods at a concentration of 2 pM prepared in polyethylene glycol (PEG) can provide a warming rate of $10^{7\circ}$ C./min. FIG. 6 provides data demonstrating the biocompatibility of gold nanorods prepared in polyethylene glycol. Embryos (n=100) were injected with the India Ink (0.2% v/v in embryo medium, as described in Kleinhans et al., 2015, *Cryobiology* 70(2):195-203; Jin et al., 2014, *Cryobiology* 68(1):71-78), gold nanorods prepared in cetyl-trimethylammonium bromide (GNR-CTAB), or gold nanorods prepared in polyethylene glycol (PEG). FIG. 6A shows the high survival of GNR-PEG embryos (65%), followed by embryos injected with GNR-CTAB at 20%, those injected with India ink at 10% (control had a 75% survival rate). Previous studies have demonstrated high survival from injections of 2.3 M Propylene Glycol (PG) into the zebrafish embryo and supported the intra-embryonic technique as being safe for the embryos.

The specimen, injected with the cryoprotectant/gold nanorods composition can be cooled using, for example, liquid nitrogen to achieve an appropriate cryogenic temperature. (FIG. 2B). Suitable cryogenic temperatures can include, for example, a temperature below the glass transition temperature of the cryoprotective agent in the cryoprotective composition. As one example, the biomaterial may be cooled to a maximum temperature of no more than −40° C. such as, for example, no more than −80° C., no more than −100° C., no more than −120° C., no more than −130° C., no more than −140° C., no more than −150° C., no more than −160° C., no more than −170° C., no more than −180° C., no more than −190° C., or no more than −200° C. In some embodiments, suitable cryogenic temperatures can include a minimum temperature of no less than −220° C., no less than −200° C., or no less than −150° C. In some embodiments, suitable cryogenic temperatures can be characterized as a range having as endpoints any maximum temperature listed above and any minimum temperature listed above that is less than the maximum temperature. In some embodiments, a suitable cryogenic temperature may be the boiling point of nitrogen, −196° C.

The specimen may be cooled at a rate of at least 50,000° C./min such as, for example, at least 69,000° C./min or at least 90,000° C./min or at least 120,000° C./min. A microfluidic system can be used to increase the cooling rates by directly printing embryos in liquid nitrogen. A cooling rate of at least 50,000° C./min is sufficient to achieve vitrification of a cryoprotective agent composition that includes 2 M propylene glycol.

A cryopreserved specimen may be rewarmed at any suitable warming rate. A specimen may be rewarmed using a critical warming rate (CWR) of 10 times to 100 times the critical rate of cooling for successful cryopreservation by vitrification. Thus, the specimen may be warmed at a rate of at least 500,000° C./min such as, for example, a rate of at least 690,000° C./min, at least 840,000° C./min, at least 1,000,000° C./min, at least 2,000,000° C./min, at least 5,000,000° C./min, at least 14,000,000° C./min.

Figure 2:
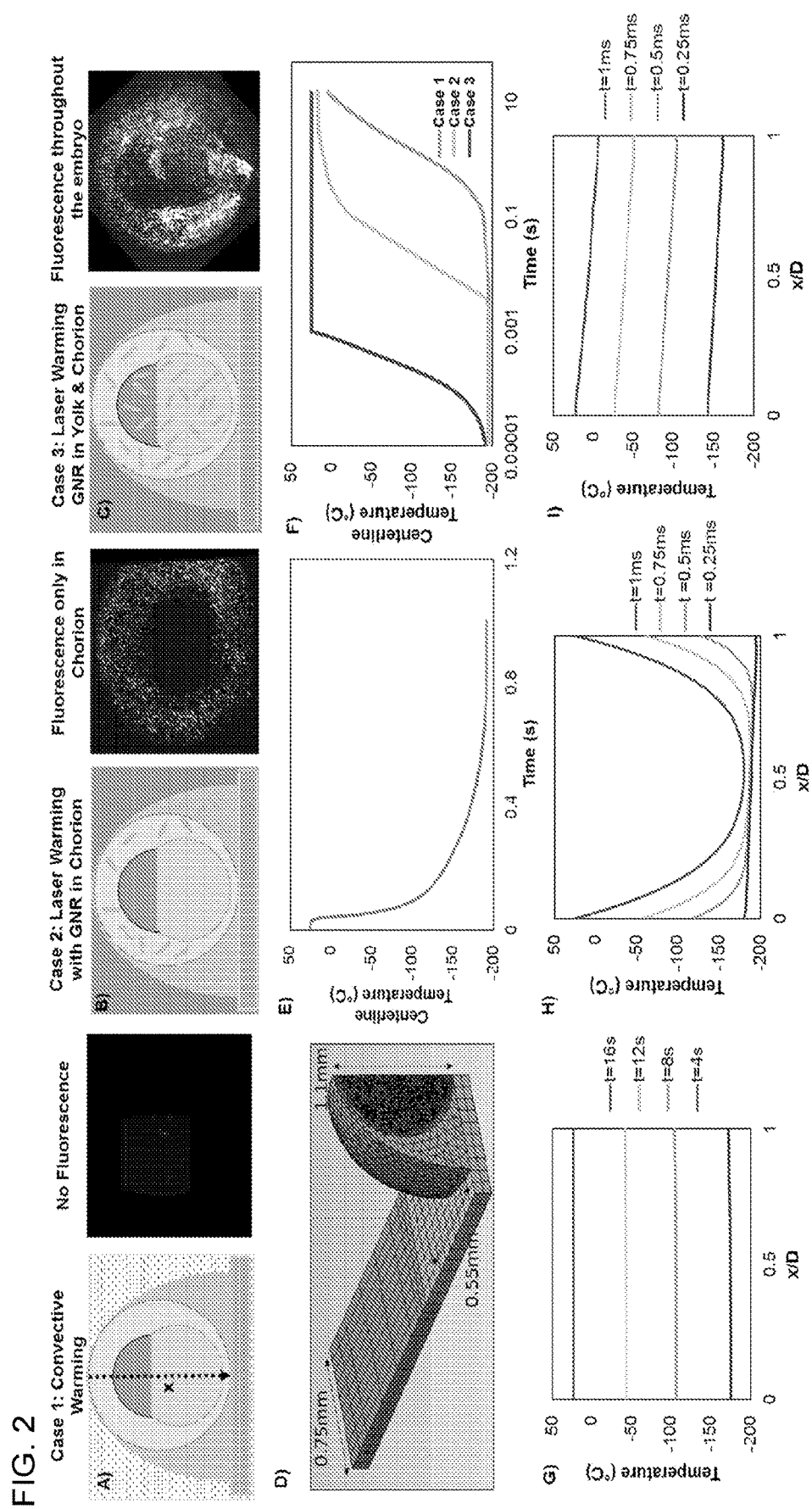
FIG. 2. Thermal model for zebrafish embryo warming with and without laser absorbers. (A), (B), and (C): distribution of GNR absorbers for the cases studied. (A) Case 1 shows the embryo under standard convective warming conditions without any GNR. (B) Case 2 shows an embryo with GNR present only in the chorion and droplet. (C) Case 3 shows an embryo with GNR distributed in the chorion and embryo—i.e., in yolk and blastoderm. Images to the left in (A), (B), and (C) represent the respective cases of zebrafish embryos injected with florescent GNR with emission wavelength at 670 nm. (D) Finite element mesh of embryo and transparent plastic blade that was used to model cooling rates. (E) Predicted cooling rate of 90,000° C./min. (F) Model-predicted warming rates for Case 1 (1020° C./min), Case 2 (51,000° C./min), and Case 3 ($1.3 \times 10^{7}$° C./min). The uniformity of warming is shown in (G), (H), and (I): (G) shows uniform but slow cooling for Case 1; (H) shows highly non-uniform warming in the middle versus chorion (edge) setting dangerous thermal gradients (and stress) in Case 2; (I) shows that warming is both uniform and rapid (greater than $10^{7}$° C./min) in Case 3.
Figure 3:
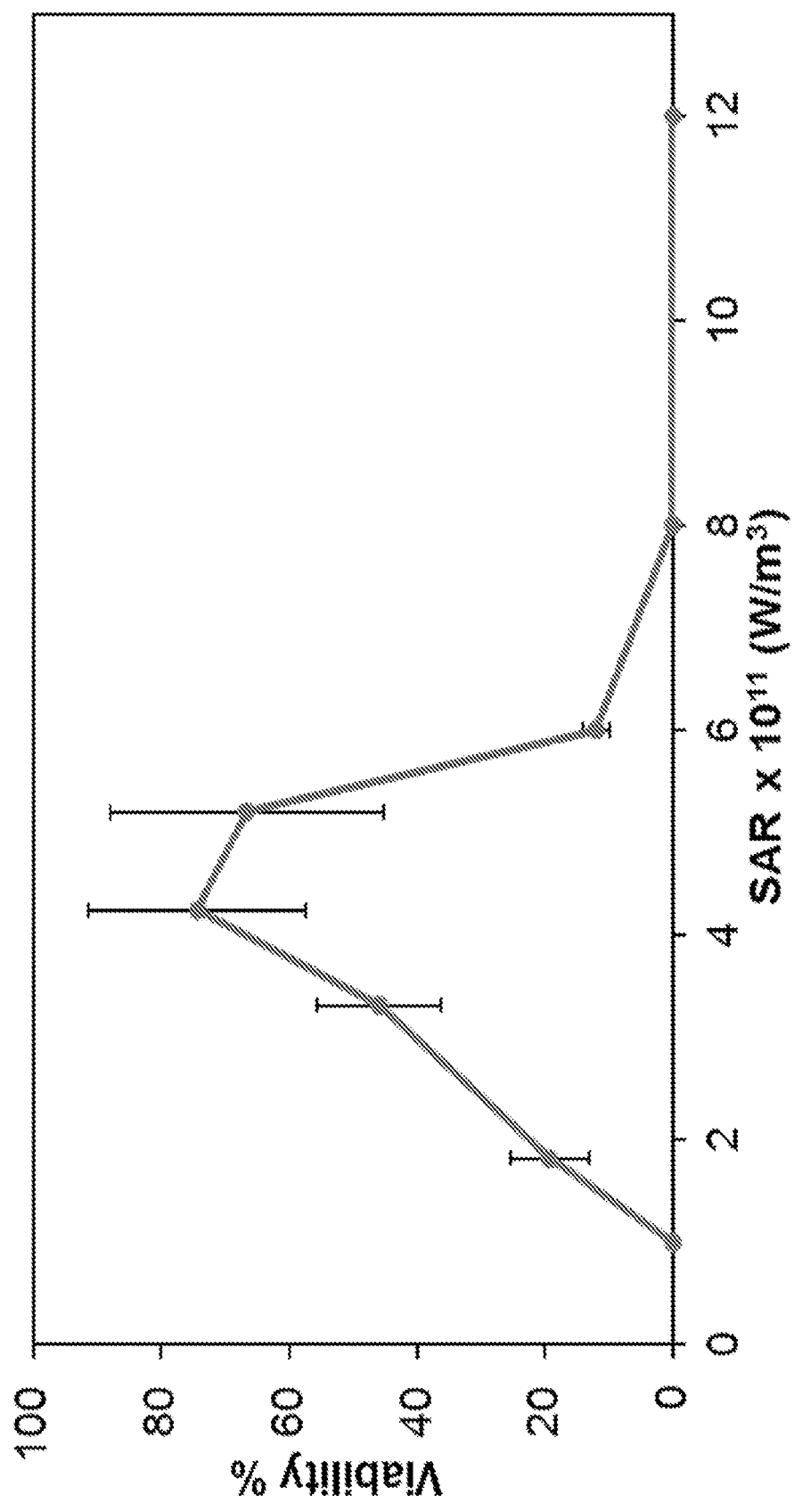
FIG. 3. Laser warming of cryopreserved Human Dermal Fibroblasts (HDF). Trypsinized HDF cells were mixed with 2 M propylene glycol and 2 pM GNR for 15 minutes. Droplets of 0.5 µL of this cell solution with concentration of 10,000 cells/mL were cooled rapidly with liquid nitrogen. Laser warming under different laser power conditions was performed and results show optimal viability SAR of approximately $4.4 \times 10^{11}$ W/m$^3$. Viability was measured by using alamarBlue assay.

Laser-assisted GNR warming can provide both ultrafast and uniform warming in the cryopreserved specimen to help achieve these needed rates. Three cases (FIG. 2) were modeled to show different scenarios for gold nanorod distribution. Case 1 provides convective warming. Case 2 provides gold nanorods in the chorion, showed high warming rates (FIG. 2F), but also high thermal gradients (FIG. 2H), which can be deleterious (i.e., thermal stress). Case 3, with uniform distribution of gold nanorods across all compartments, showed high warming rates (FIG. 2F) and much lower thermal gradients than Case 2 (FIG. 2I). Case 3 provides a high enough warming rate to avoid devitrification while avoiding critical thermal stress. Case 3 provides uniform warming at a rate of $1.4 \times 10^{7}$° C./min at a gold nanorods concentration of 2 pM and at laser pulse energy of 2 J.

Figure 4:
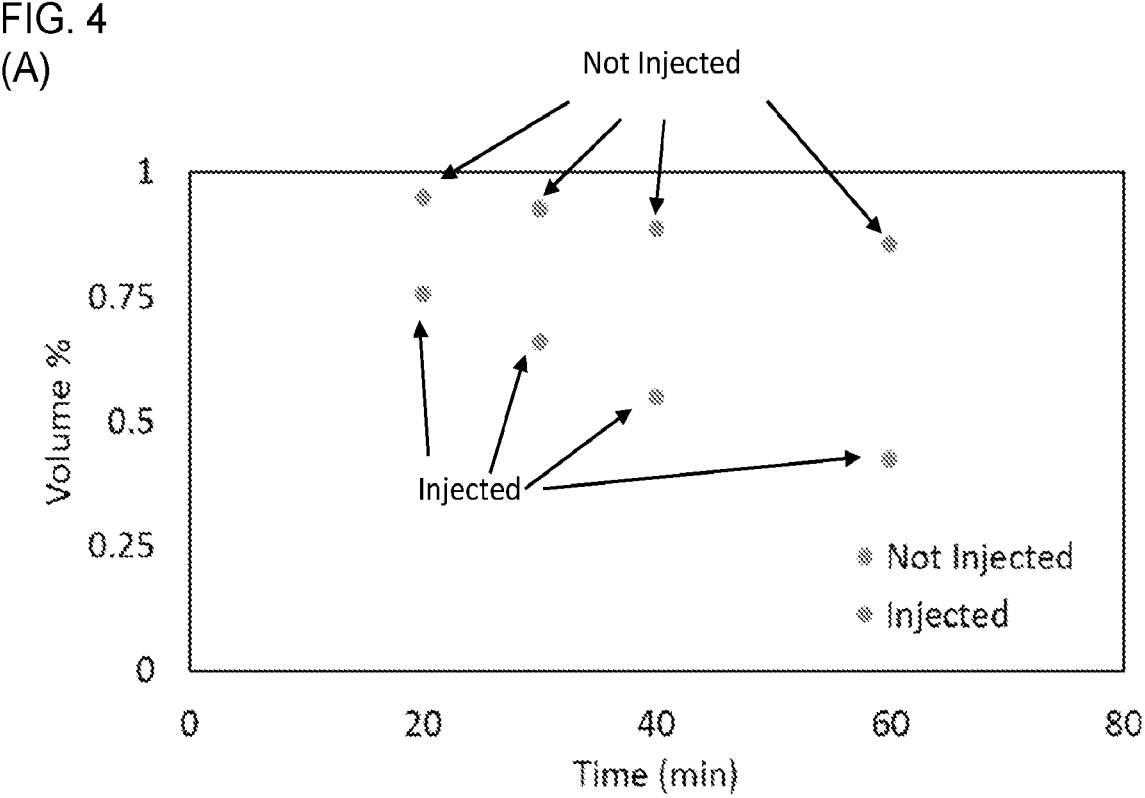
FIG. 4. (A) Volume change of zebrafish embryos when placed in 2 M sucrose over an hour. The volume was measured optically by using a microscope. (B) The viability rate was measured immediately after embryos, both injected and uninjected, after they were rehydrated for four hours. The control group represents live embryos placed in embryo medium.
Figure 4:
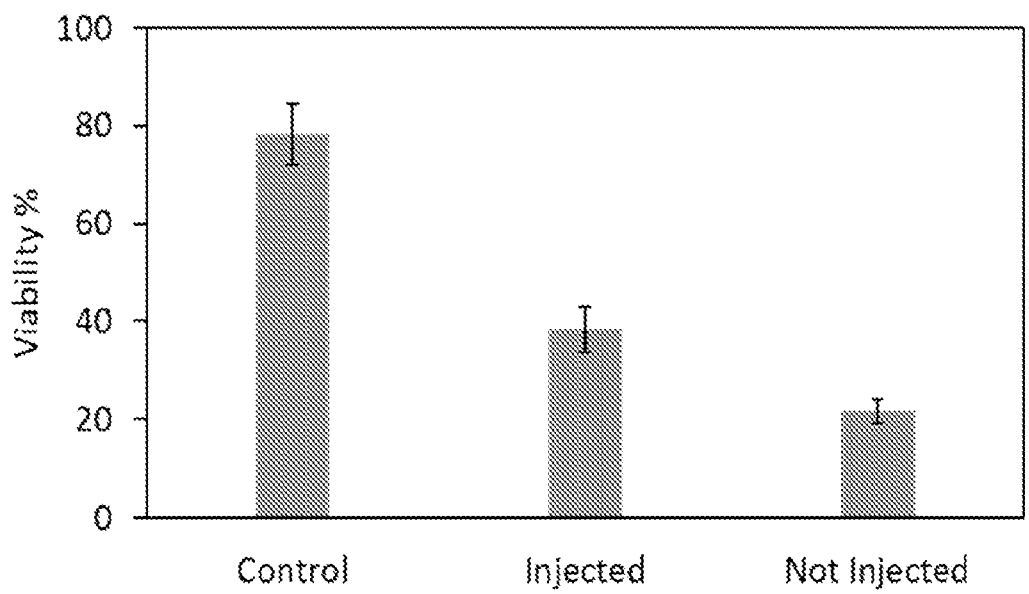
Figure 5:
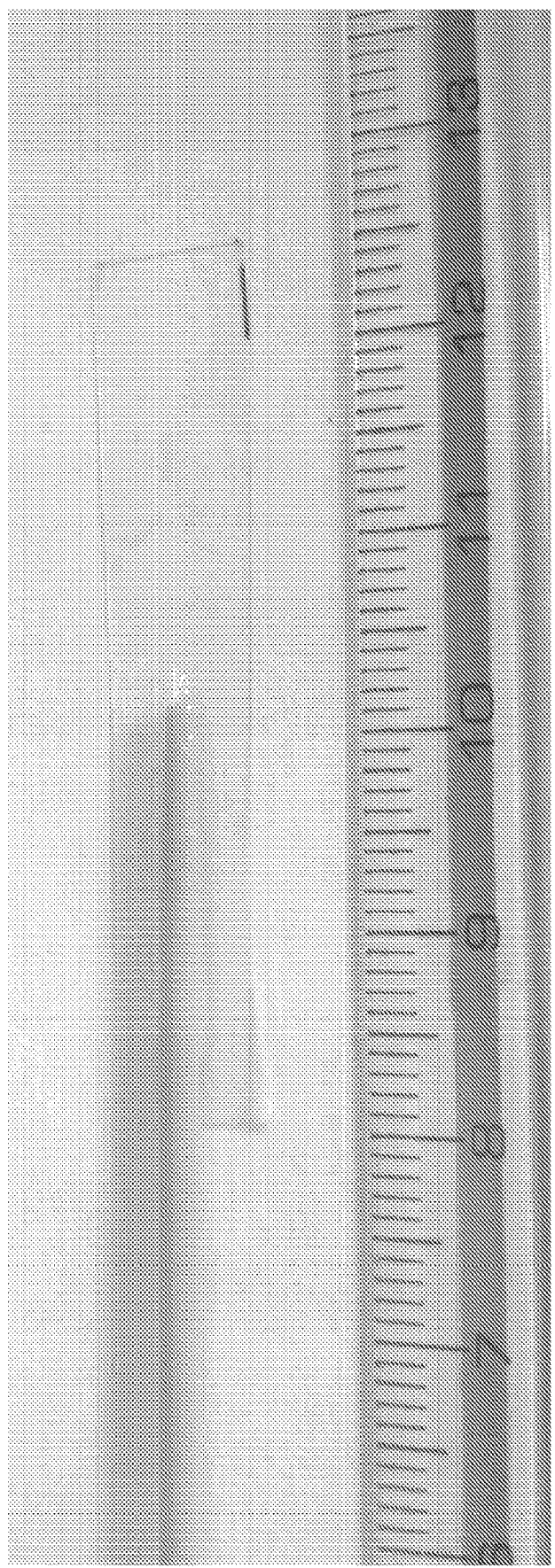
FIG. 5. Image of the transparent plastic blade used to load embryos during vitrification and laser rewarming.

In some cases, the protocol can include a dehydration step (FIG. 4) after the cryoprotective agent and gold nanorods are injected into the specimen and before the specimen is cooled. In some cases, the dehydration of the specimen will be achieved by using hypertonic solutions of lactose, raffinose, trehalose, and/or sucrose (e.g., 2 M sucrose). In such cases, the specimen can be rehydrated after rewarming. This can be done by placing the specimen in an isotonic solution (e.g., 2 M sucrose). The solution can then be sequentially diluted using, for example, embryo medium water (solution of water and ocean salts) gradually over an appropriate period of time (e.g., decrease the concentration of the solution by 25% every hour for four hours). The initial data shows 2 M sucrose hypertonic solution can dehydrate injected zebrafish embryos up to 50% within one hour. Approximately 30% of the dehydrated embryos survive rehydration and this can be improved by slowing down the rehydration process.

Figure 7:
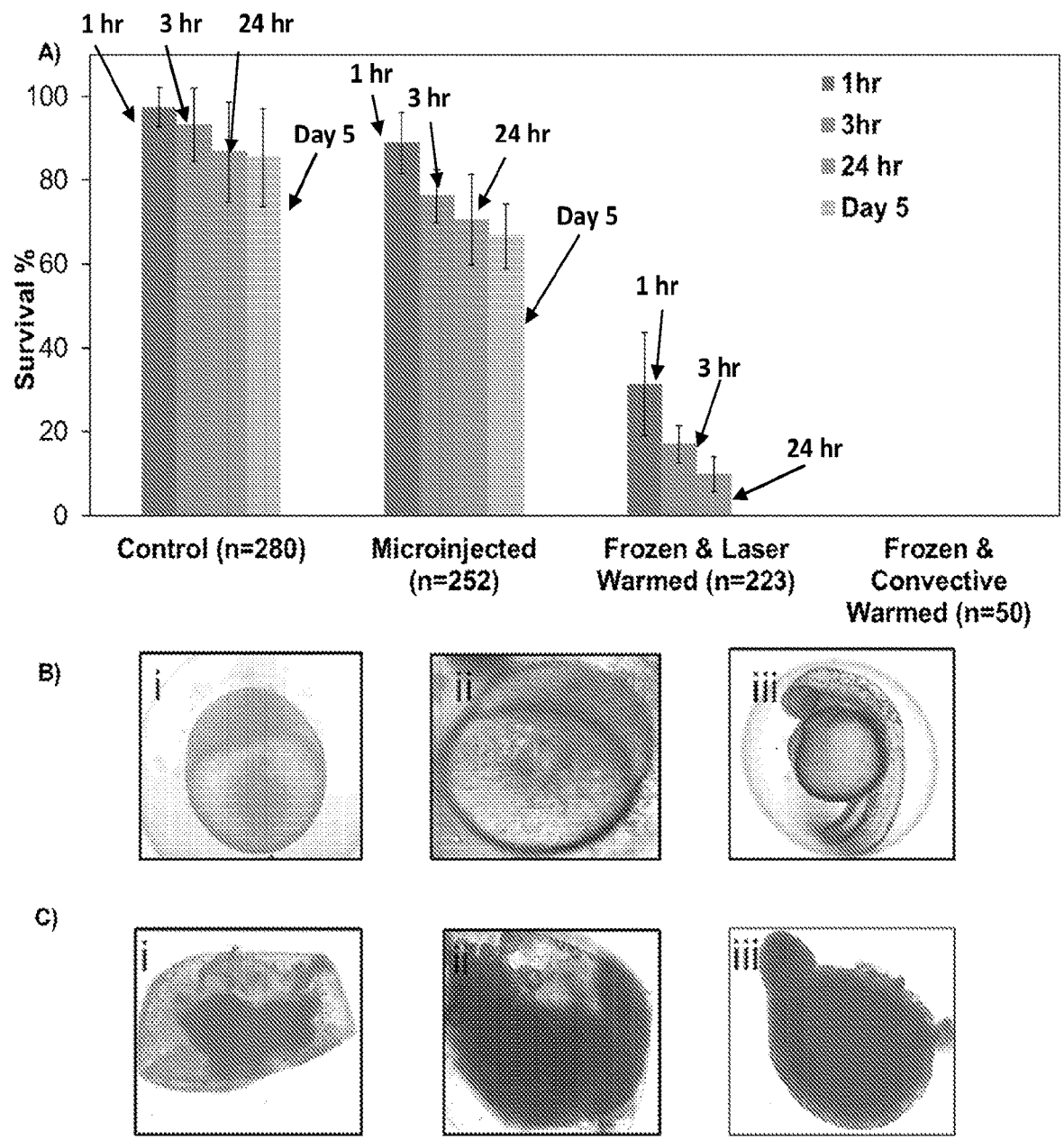
FIG. 7. Laser warming of zebrafish embryos yields consistent survival. (A) Survival of fish embryos up to Day 5 using four treatments: i) embryo medium only (uninjected); ii) microinjection with PEG-coated GNRs in 2M PG and no cooling; iii) microinjection with PEG-coated GNRs in 2 MPG, cooling, and laser warming; and iv) microinjection with PEG-coated GNRs in 2 M PG, cooling, and convective warming. Survival one hour post-warming was 31% and indicated intact morphology after cooling. At three hours post-warming, 16% of the embryos were intact and continued developing. 24 hours after laser GNR warming, 5% developed into juvenile fish, moving within their chorion. Convective warming did not produce even any intact embryos post-warming. Thus, 5% survival at 24 hours is a significant improvement over convective cooling (p<0.001, ANOVA). (B) Example of the morphology of a live fish embryo post laser warming. The images (i, ii, and iii) identify the changes in morphology and development after cooling and laser warming at one hour, three hours, and 24 hours post-warming. At 24 hr, the embryo moved in their chorion validating post-warming viability. (C) Example of the morphology of a dead fish embryo post convective warming. The images (i, ii and iii) identify the dead and dark cells after cooling and convective warming at one hour, three hours, and 24 hours post-warming.

FIG. 6 and FIG. 7 show data demonstrating survival of specimens following injection with the composition (FIG. 6) and following freezing a rewarming (FIG. 7). Morphological and developmental changes through Day 5—e.g., presence of swim bladder, ability to swim normally, straight alignment of trunk musculature, and presence of normal heart and gills—were used to determine survival of injected and, in the case of FIG. 7, frozen and rewarmed specimens.

FIG. 6A shows that GNR-PEG preparation produced more normal embryos at Day 5 than the GNR-CTAB or India Ink preparations (p<0.001, ANOVA). No statistical difference (p>0.1, ANOVA) was found between PEG-coated GNR and embryo medium control injection. In contrast, the higher number of normal embryos at Day 5 using GNR-PEG versus GNR-CTAB or India Ink was statistically significant (p<0.001, ANOVA).

FIG. 6B shows the survival of embryos at various stages of development when injected with GNR-PEG. There was no statistical difference in survival between the High cell, 50% epiboly, and 8 somite stages. By comparison, the 16 Cell stage yielded the least survival (p<0.001, ANOVA). In laser warming experiments, the High cell stage was used to inject embryos with propylene glycol and GNR-PEG.

Embryos injected with a GNR-PEG composition, frozen, and laser rewarmed developed into juvenile fish, moving within their chorion (FIG. 7B). Convective warming did not produce any intact embryos post-warming. Thus, the 5% survival reflected in FIG. 7A represents a significant improvement over convective cooling (p<0.001, ANOVA). FIG. 6C and FIG. 6D show that morphological differences between live and dead embryos are visible post-injection, pre-freezing. Thus, the yield of live cells post-rewarming can be improved by selecting cells that are alive post-injection, then freezing only those cells that pass the selection process.

Live cells may be selected using any suitable method including, for example, manual selection, centrifugation, or flow cytometry. In one embodiment, a microfluidic system could allow for high throughput optical sorting of viable versus nonviable embryos at room temperature prior to printing into liquid nitrogen.

The selection of live cells may be automated in a high-throughput system. The system can incorporate droplet microfluidics to transport cells through the system and/or add regents—e.g., a cryopreservation agent, an excipient, culture medium, metal laser absorber (e.g., gold nanorods), etc.—to the cells prior to the cells being frozen. Multi-phasic droplet microfluidics may be used to introduce a plurality of components to the cells. In addition, once frozen, embryos could be stored and/or transported to a laser warming jig that would quickly move embryos (one at a time) under a laser pulse.

In the preceding description and following claims, the term "and/or" means one or all of the listed elements or a combination of any two or more of the listed elements; the terms "comprises," "comprising," and variations thereof are to be construed as open ended—i.e., additional elements or steps are optional and may or may not be present; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

In the preceding description, particular embodiments may be described in isolation for clarity. Unless otherwise expressly specified that the features of a particular embodiment are incompatible with the features of another embodiment, certain embodiments can include a combination of compatible features described herein in connection with one or more embodiments.

For any method disclosed herein that includes discrete steps, the steps may be conducted in any feasible order. And, as appropriate, any combination of two or more steps may be conducted simultaneously.

The present invention is illustrated by the following examples. It is to be understood that the particular examples, materials, amounts, and procedures are to be interpreted broadly in accordance with the scope and spirit of the invention as set forth herein.

EXAMPLES

Example 1

The embryo is injected at the high cell stage (T=3.3 hr) in order to maximize the uniformity of distribution throughout the embryo as it grows. The injection contains 2 M propylene glycol and $12 \times 10^{11}$ nps/mL. The injection mixture is injected in the yolk (10 nL) and the chorion (100 nL). The embryos are kept in zebrafish embryo medium (5.03 mM NaCl, 0.17 mM KCl, 0.33 mM $CaCl_2.2H_2O$, 0.33 mMMgSO$_4$.2H$_2$O, 0.1% (w/v) methylene blue) until they reach 100% epiboly stage (T=10 hr).

At this stage, dehydration can be employed or move to the vitrification stage. Dehydration allows the reduction of intracellular water in the embryo by 30%, which has been shown to increase the intracellular concentration and hence lower the cooling and warming rates for successful cryopreservation. Embryos can be immobilized in agarose while placed in a 2 molal sucrose solution. The volume of the embryos can be optically tracked. In some cases, dehydration can have performed at different embryonic stages to determine which stages produce high survival rates after dehydration. After vitrification and laser rewarming, the embryos can be rehydrated by placing the embryos in a 1 molal solution and sequentially diluting by 0.25 molal every hour for four hours.

During the vitrification stage, a single embryo, held on thin plastic blade (0.1 mm thick) is cooled in liquid nitrogen (LN$_2$) for at least two minutes. The blade can be removed from the motor arm and stored in LN$_2$.

For the laser rewarming stage, the blade with vitrified embryo is attached to the motor arm inside the LN$_2$. The motor arm moves the blade out of the LN$_2$ and into position for laser warming. A laser pulse is fired onto the vitrified embryo. Video recording of the entire transition has shown moving from LN$_2$ into the laser field takes approximately 0.25 seconds. After the laser pulse is fired, the embryo can be removed from the blade and placed into embryo medium water. If the embryo was dehydrated prior to vitrification, the embryo will be rehydrated.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A method of warming a cryopreserved biospecimen, the method comprising:
    obtaining a cryopreserved specimen comprising a cryoprotective composition, the cryoprotective composition comprising:
        a cryoprotective agent; and
        a laser absorber comprising a plasmonic material; and
    subjecting the cryopreserved specimen to a laser pulse effective to heat the laser absorber sufficiently to rewarm the cryopreserved biospecimen; wherein the cryopreserved specimen comprises a cell and the laser absorber is distributed in all compartments of the cell.

2. The method of claim 1 wherein the laser absorber comprises a gold nanorod.

3. The method of claim 1 wherein the cell is an oocyte and the laser absorber is distributed in the chorion and the yolk.

4. The method of claim 1 wherein the cryoprotective agent comprises polyethylene glycol.

5. The method of claim 4 wherein the polyethylene glycol is present at a concentration of no more than 6 M.

6. The method of claim 4 wherein the polyethylene glycol is present at a concentration of no more than 3 M.

7. The method of claim 1 wherein the laser pulse produces a warming rate of at least 500,000° C./min.

* * * * *